United States Patent [19]

Takabayashi et al.

[11] Patent Number: 4,942,092
[45] Date of Patent: Jul. 17, 1990

[54] EXTRUDED POROUS ARTICLES OF POLYIMIDE AND CONTINUOUS PREPARATION OF THE SAME

[75] Inventors: Seiichirou Takabayashi, Ube; Masaki Egami, Yokkaichi, both of Japan

[73] Assignees: Ube Industries, Ltd., Ube; NTN-Rulon Industries, Ltd., Tokyo, both of Japan

[21] Appl. No.: 339,890

[22] Filed: Apr. 17, 1989

Related U.S. Application Data

[63] Continuation of Ser. No. 939,369, Dec. 8, 1986, abandoned.

[30] Foreign Application Priority Data

Dec. 6, 1985 [JP] Japan .................... 60-274613

[51] Int. Cl.⁵ .............................................. B32B 5/16
[52] U.S. Cl. .................. 428/401; 428/473.5; 521/919
[58] Field of Search .............. 428/473.5, 372, 317.9, 428/401; 264/126, 323; 425/461, 378 R; 521/919

[56] References Cited

U.S. PATENT DOCUMENTS 4,238,538 12/1980 Manwiller ..................... 428/372 X

*Primary Examiner*—Thomas J. Herbert
*Attorney, Agent, or Firm*—Frishauf, Holtz, Goodman & Woodward

[57] ABSTRACT

An extruded porous article, which can be prepared by a ram-extruding method, comprising an aggregated aromatic polyimide powder which has a heat loss ratio of not more than 2 wt. %, the heat loss ratio being measured at 360° C. for 1 hour, and a mean particle size in the range of 1 to 40 μm, wherein pores are distributed essentially uniformly in the article, and its porosity is in the range of 5-20%, the porosity % being defined by the formula:

$$\left(1 - \frac{\text{apparent density of article}}{\text{true density of article}}\right) \times 100.$$

8 Claims, 1 Drawing Sheet

EXTRUDED POROUS ARTICLES OF POLYIMIDE AND CONTINUOUS PREPARATION OF THE SAME

This is a continuation of 939,369, filed 12/8/86, now abandoned.

BACKGROUND OF THE INVENTION

1. Field of the Invention

This invention relates to a shaped porous article of an aromatic polyimide having excellent heat resistance and mechanical properties and further being able to be cut with no difficulty. This invention further relates to a method for continuously preparing on an industrial scale a shaped long porous article of aromatic polyimide by ram-extrusion process using a specific aromatic polyimide powder.

2. Description of Prior Arts

It has been regarded difficult to form thick shaped articles of an aromatic polyimide because the aromatic polyimide is not thermoplastic and not melted by heating.

As a method of forming shaped articles of aromatic polyimide using an aromatic polyimide powder, a method disclosed in, for example, Japanese Patent Publication No. 49(1974)-5737 has been proposed and actually practised. The method is characterized in that an aromatic polyimide powder is compressed at a pressure in the range of 700 to 7,000 kg/cm$^2$ and at a temperature in the range of room temperature to 400° C. to form a pressed article, and the resulting article is converted into a shaped article in which particles of the powder are bonded to each other through fused phase, by heating at a temperature in the range of 300° to 500° C. without pressure.

In the above known method, however, a large-sized and powerful compression press is required to carry out the preparation of the pressed article under extremely high pressure. Further, it is difficult to produce a sufficiently long shaped article such as a rod having a length of more than approx. 1 meter on industrial scale. Furthermore, the above method comprises steps of filling and compressing the powder, taking out a preformed article and heating the article. These steps should be performed individually and sequentially to produce one article. Therefore, conticuous forming is substantially impossible and productivity is not satisfactory.

A method for continuous preparation of a long shaped article of a polyimide or polyamide resin is described in U.S. Pat. No. 4,238,538. This method uses an apparatus including a die with compaction, back pressure and relief zone and comprises ram-extruding the resin at a temperature of between about 20° C. and 400° C., but below the second order glass transition temperature of the resin to form a shaped article, followed by heating at a temperature above about 250° C., for a time sufficient to coalesce the resin.

Another method for continuous preparation of a long shaped article of a polyimide is described in U.S. Ser. No. 888,929 filed by the present applicants.

SUMMARY OF THE INVENTION

As a result of study of the present inventors for a new method for forming an extruded long article of an aromatic polyimide powder, they have discovered that ram-extrusion forming method using a specific polyimide powder can make it possible to continuously forming a shaped long porous article having satisfactory strength.

Accordingly, there is provided by the present invention an extruded porous article comprising an aggregated aromatic polyimide powder which has a heat loss ratio of not more than 2 wt. %, the heat loss ratio being measured at 360° C. for 1 hour, and a mean particle size in the range of 1 to 40 μm, wherein pores are distributed essentially uniformly in the article, and its porosity is in the range of 5–20%, the porosity % being defined by the formula:

$$\left(1 - \frac{\text{apparent density of article}}{\text{true density of article}}\right) \times 100.$$

The above-mentioned porous article can be advantageously prepared by a method of continuously shaping a long porous article of an aromatic polyimide powder comprising the steps of:

supplying an aromatic polyimide powder having a heat loss ratio of not more than 2 wt. %, the heat loss ratio being measured at 360° C. for 1 hour, and a mean particle size in the range of 1 to 40 μm to a ram-extrusion apparatus having a mold; and performing alternately, at a temperature of not lower than 280° C., filling the mold with the above powder and ram-extruding the same at a pressure in the range of 50–1,000 kg/cm$^2$, thereby producing a shaped porous article.

The porous polyimide article of the invention has a uniform porous structure and excellent thermal properties such as a high heat resistance and a high heat stability. For instance, the porous polyimide article of the invention has a high thermal deformation temperature and a high dimensional stability due to stable thermal expansion coefficient at temperature in the range of from room temperature to approx. 300° C. Further, the porous polyimide article of the invention can be cut with no difficulty.

Accordingly, the porous polyimide article of the present invention finds a variety of uses in fields of art requiring thermal stability and porous structure.

Furthermore, since the porous extruded article of the invention can easily absorb and retain an oil within the essentially uniform pores thereof, it is advantageously used as a bearing after being fabricated in the form of a ring.

The porous article of the invention has a great number of pores distributed essentially uniformly in the articles. For instance, the difference of specific gravity between two positions being apart by 10 cm from each other preferably is not more than 0.15, more preferably is not more than 0.08.

The porous article of the invention has a porosity in the range of 5–20%, preferably 6–18%, the porosity % being defined by the above formula. Accordingly, the porous article of the invention can be employed per se as heat-insulating material, and otherwise employed as bearing or sliding rod upon incorporation of an oil into the porous structure. For the employment in such uses, the article should have not only a porous structure but also a certain mechanical strength. If the article has a porosity less than 5%, the porous structure does not well serve for keeping a sufficient volume of air or oil therein. If the porosity of the article is more than 20%, the mechanical strength is not enough for these uses.

The oil incorporatable in the porous structure of the article generally is selected from oils which are conventionally employed as lubricating oils. Examples of the oils include mineral oils, synthetic oils, silicone oils and fluorinated oils.

According to the method of the invention, long shaped porous articles in the form of bar or tube (thick shaped articles) having various kinds of sections (e.g. circular, oval, square, triangular, hexagonal and torus) can be continuously formed at relatively low pressure without any trouble by means of a relatively small sized ram-extrusion apparatus. Accordingly, the method of the invention is satisfactory in productivity.

DETAILED DESCRIPTION OF THE INVENTION

Figure 1:
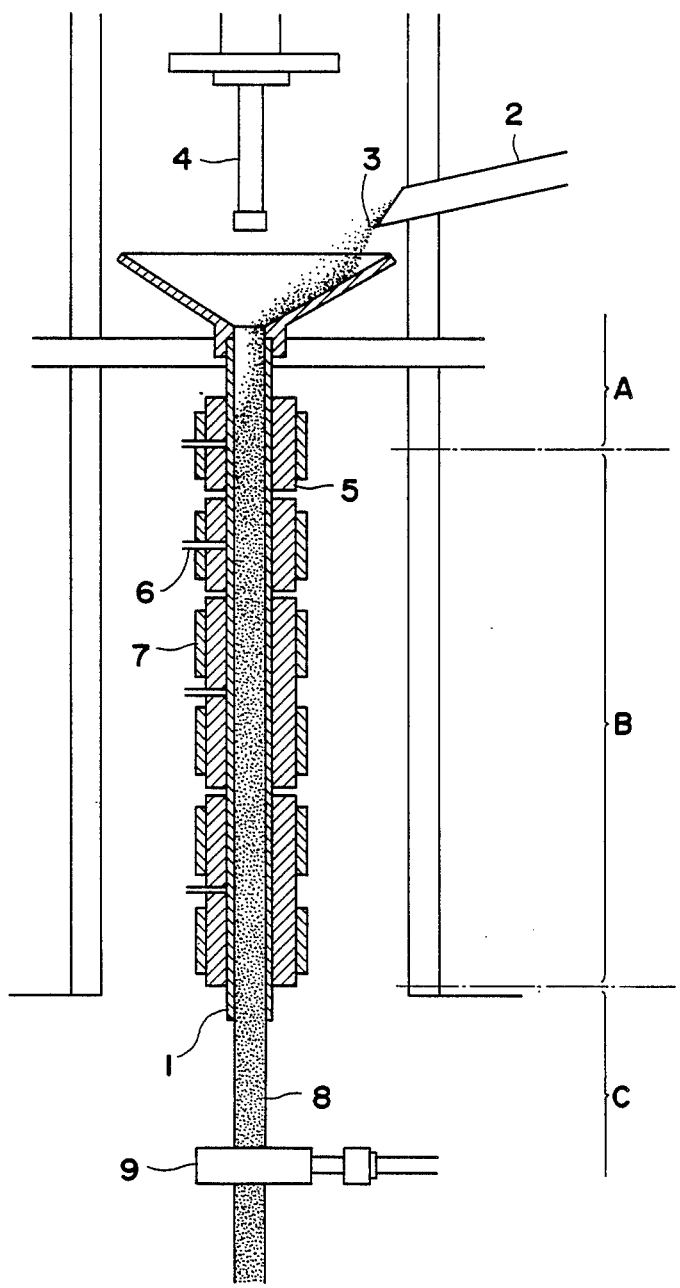
FIG. 1 is a cross-sectional view of main parts of a ram-extrusion apparatus employable for performing one embodiment of the method of the invention.

An aromatic polyimide powder employed in the invention preferably comprises not less than approx. 80 wt. % of heat-resistant aromatic polyimide powder having heat loss ratio of not more than 2 wt. %, preferably not more than 1 wt. % (the value is measured by heating at 360° C. for 1 hour), and a mean particle size in the range of 1 to 40 $\mu$m, more preferably 2 to 35 $\mu$m, and most preferably 5 to 30 $\mu$m. Among the particles of the polyimide powder, 80% of the particles preferably have particle sizes in the range of 0.1 to 50 $\mu$m.

As the above aromatic polyimide powder, any aromatic polyimide powder can be employed, so long as the powder consists essentially of a heat-resistant aromatic polyimide polymer obtained through polymerization and imidation of an aromatic diamine(s) and a tetracarboxylic acid or its derivative such as aromatic tetracarboxylic acid or acid dianhydride thereof. Each of the aromatic diamine and tetracarboxlic acid or its derivative can be employed singly or in combination.

Examples of the above aromatic tetracarboxylic acid and it derivative include aromatic tetracarboxylic acids such as pyromellitic acid, 3,3',4,4'-biphenyltetracarboxylic acid, 2,3,3',4'-biphenyltetracarboxylic acid, 3,3',4,4'-benzophenonetetracarboxylic acid, bis(3,4-dicarboxyphenyl) ether, bis(3,4-dicarboxyphenyl) thioether, bis(3,4-dicarboxyphenyl)methane and 2,2-bis(3,4-dicarboxyphenyl)propane, acid dianhydrides thereof and a mixture of the above-mentioned compounds. In the invention, preferred is a tetracarboxylic acid consisting essentially of biphenyltetracarboxylic acid (contained not less than approx. 50 mol. %, preferably not less than 70 mol. %) from the viewpoints of moldability of the obtained aromatic polyimide powder and physical properties of the resulting article.

Examples of the above aromatic diamine include 4,4'-diaminodiphenyl ether, 4,4'-diaminodiphenyl thioether, 4,4'-diaminodiphenylmethane, 4,4'-diaminobenzophenone, and o-, m- or p-phenylenediamine and mixtures of these diamines. In the present invention, preferred is an aromatic diamine consisting essentially of 4,4'-diaminodiphenyl ether (contained not less than approx. 40 mol. %, preferably not less than 50 mol. % and most preferably not less than 70 mol. %).

There is no specific limitation on the process for preparation of the aromatic polyimide powder. For example, the aromatic polyimide powder can be prepared by polymerizing and imidizing the tetracarboxylic acid component (i.e., acid itself or its derivative) and the aromatic diamine in an approx. equivalent molar amount in an organic polar solvent at a high temperature, thereby precipitating an aromatic polyimide powder.

In another process, the above two components are subjected to polymerization in an organic polar solvent at a relatively low temperature to produce an aromatic polyamic acid. Subsequently, a solvent which does not dissolve the polyamic acid is added to the polymerization liquid so as to precipitate an aromatic polyamic acid powder. The powder is then subjected to imidation by heating (imidation cyclization through dehydration of an acid-amide bond of the polyamic acid), thereby obtaining an aromatic polyimide powder.

In the invention, an aromatic polyimide powder having too large mean particle size would show poor fluidability and insufficient adhesion (i.e., partial fusion) between the particles during the ram-extrusion procedure, resulting in deterioration of the molding properties and mechanical strength of the obtained articles. Therefore, the aromatic polyimide powder having too large mean particle size is not suitable in the invention.

Further, in case that a large amount of volatile substance (such as organic polar solvent having a high boiling point, low molecular weight organic material, heat decomposable substance, water, etc.) is contained inside of the aromatic polyimide powder, vaporization of these volatile substances brings about unfavorable results in the course of the ram-extrusion such as difficulty in molding. In these cases, the mechanical properties of the obtained articles such as flexural strength and compression strength extremely are made lower. Therefore, the aromatic polyimide powder is required to show a heat loss ratio of not more than 2 wt. % when it is heated for 1 hour at a temperature of 360° C. (the "360°C." is a temperature for a typical molding procedure).

In the case that the aromatic polyimide powder contains a large amount of a volatile component, particularly water, the powder should be subjected to drying or heating treatment in an inert gas atmosphere such as a nitrogen gas and helium gas or in the stream of the gas at a temperature in the range of 50° to 400° C., preferably 100° to 380° C. for a suitable period of time (e.g. 0.2 to 5 hours, preferably 0.5 to 3 hours) by means of a hot-air drying oven so as to remove the volatile component, thereby obtaining suitable heat loss ratio. In this way, the above-mentioned unfavorable influences can be prevented.

In the method of the invention, the powdery polyimide resin may contain a small amount of suitable organic or inorganic additives and fillers having mean particle sizes similar to those of the above polyimide powder so as not to give unfavorable influence on the ram-extrusion molding.

The method of the invention can be carried out as follows. At first, the polyimide powder is supplied to a ram-extrusion apparatus. Then, the powder is filled in a mold and pressed (compressed) into the mold at a pressure of 50–1,000 kg/cm$^2$, preferably 100–900 kg/cm$^2$, and more preferably 100–700 kg/cm$^2$. The filling and compressing procedures are carried out alternately at a temperature not lower than 280° C. and preferably in the range of 300° to 500° C. Subsequently, the powder is extruded under heating in the form of a long shaped aggregated article, thereby continuously producing a long shaped article of aggregated polyimide powder.

The above-mentioned ram-extrusion apparatus is not a type of that provided with a rotary screw which is usually provided to a screw-extrusion apparatus. The apparatus is so designed as to compress a powder into a long mold by means of reciprocating movement of a ram, namely, an extruding bar, and to sinter the mixture, thereby continuously forming a shaped article.

As shown in FIG. 1, for example, the apparatus is required to be provided with (a) cylindrical (i.e., tube-shaped) mold 1 having filling zone A, heat-sintering zone B and cooling zone C arranged in this order; (b) ram 4 provided over the mold 1 and capable of reciprocating toward the inner part (opening) of the filling zone A of the mold 1; and (c) pressure regulator 9 for regulating pressure in the mold by imparting back pressure to the shaped article 8 extruded from the cooling zone C of the mold 1 utilizing frictional force between the surface of the extruded article and the inner wall of the pressure regulator. Any apparatus having the above structure may be employed in the invention. Also employable are ram-extrusion apparatus disclosed in U.S. Pat. No. 4,238,538 and U.S. Pat. No. 4,266,919.

It is preferred that the mold 1 is provided with a heat sintering portion B covered with a plurality of aluminum blocks 5 and being maintained at a suitable temperature (not lower than 280° C., preferably not lower than 300° C.) adjusted by a combination of controlling temperature indicator 6 and band heater 7. If necessary, a heat insulating layer may be provided around the band heater 7 to prevent escape of heat.

The method of the invention for forming shaped articles of the powder by means of the above ram-extrusion apparatus is carried out, for example, as follows. The powder 3 is supplied to the filling zone A of the mold 1 of the ram-extrusion apparatus from a hopper (feeder) 2 to fill the mold with the powder 3. The filled powder is then compressed by ram 4 toward the heat shintering zone B of the mold 1. The above procedures of filling and compressing the powder are performed alternately to move the powder to the lower portion of the heat sintering zone B of the mold 1. At the same time, the powder is compressed, heated and sintered to form a shaped article 8. The shaped article 8 is cooled in the cooling zone C and extruded from the mold 1.

The whole surface of the inner wall of the mold 1 of the ram-extrusion apparatus is preferably coated with a coating layer of nickel, molybdenum disulfide or fluororesin. Provision of the coating layer will advantageously decrease frictional resistance and resistance by adhesion between the powder passing in the mold or compressed articles under sintering and the inner wall of the mold, thereby facilitating movement of the article towards the lower portion of the mold.

The inner surface of the mold is preferably coated with fluororesin or mixture consisting of fluororesin, additives or fillers (including metal powder). The inner surface of the mold may be provided with hard chrome plating or nickel plating, and then coated with a fluororesin such as polytetrafluoroethylene thereover.

In the method of the invention, the pressure in the mold of the ram-extrusion apparatus is determined by the frictional resistance between the inner wall of the mold and the article which is under formation by carrying out alternately filling and extruding the powder under the above-mentioned conditions, and the frictional resistance between the back pressure regulator (i.e., back pressure-supplying means) 9 and the article 8 which comes out of the lower portion of the mold 1.

The physical properties of shaped articles are apt to be highly influenced by the frictional resistance of the back pressure regulator 9 which generates pressure when the powder is shaped in the mold.

As described above, the aromatic polyimide powder 3 introduced through the upper end of the mold 1 is converted into the aggregated article 8 by thermal fusion under the intermittent pressure given by the reciprocal action of the ram 4, extruded from the lower end of the mold, and cooled. For the preparation of the uniformly porous article having a satisfactory mechanical strength, the mechanical resistance given by the inner wall of the mold 1 generally is not enough. For this reason, the back pressure-supplying means 9 is provided for supplying a constant extruding pressure. The back pressure-supplying means 9 is arranged in an appropriate position below the exit of the extruder to impart a back pressure P (pressure in the direction being reverse to the extruding direction) by squeezing the extruded article 8. The back pressure P is calculated using the following equation:

$$P = F \times \mu / S$$

wherein F is a force in the vertical direction along the axis of article 8 of squeezing the article, which is given by the back pressure-supplying means; $\mu$ is a frictional coefficient occurring along the interface between the article 8 and the back pressure-supplying means 9; and S is a sectional area of the article 8.

The extruded article is cooled under the atmospheric condition in the vicinity of the back pressure-supplying means to have a temperature of not higher than 300° C., preferably a temperature in the range of 250° to 300° C.

In the method of the present invention, in order to continuously produce long shaped porous articles under relatively low pressure by means of a relatively small sized ram-extrusion apparatus with high productivity, frictional resistance in the mold is required to be as small as possible. Further, in order to obtain long shaped articles having excellent physical properties, the back pressure caused by the frictional resistance of the back pressure regulator 9 should be adjusted within a specific range. In case that the back pressure is too low, the density of the obtained article becomes low to show poor mechanical properties. On the other hand, in case that the back pressure is too high, the density becomes too high to show poor porosity.

The back pressure caused by frictional resistance of the back pressure regulator 9 differs depending on the composition of the powder employed, size or shape of the shaped article, size or shape of the mold and the frictional resistance of the shaped article in the mold. It is practically desirable that the back pressure is in the range of approx. 10 to 65 kg/cm$^2$, preferably 15 to 60 kg/cm$^2$ and more preferably 20 to 55 kg/cm$^2$.

The back pressure regulator 9 separately provided to the mold is preferably employed to obtain back pressure. In case of molding a tube-shaped article, the length of the stem can be adjusted through a phenomenon that the shaped tube holds a stem when it is cooled and hardened so that the frictional resistance in the tube is adjusted.

The extrusion rate (i.e., molding rate) of the ram-extrusion apparatus is determined depending on the size of the shaped article and capacity of the heater of the mold. It is preferred to mold at approx. 500 to 2,000 mm/hr and preferably 600 to 1,500 mm/hr.

The article produced by the above-described ram-extrusion method, i.e., an extruded porous article of an aromatic polyimide of the invention, can be annealed at a temperature of higher than 250° C. for removing residual stress.

The invention will be further described with reference to examples and comparison examples.

EXAMPLES 1 TO 7

Long shaped porous articles having outer diameter of mm were continuously produced from an aromatic polyimide powder (mean particle size: 12.0 μm or 22.5 μm, specific gravity 1.40, having a heat loss ratio shown in Table 1) prepared through polymerization and imidation of 3,3′,4,4′-biphenyltetracarboxylic acid dianhydride and 4,4′-diaminodiphenyl ether by means of a ram-extrusion apparatus illustrated in FIG. 1 under conditions as set forth in Table 2. As the mold, a mold made of solid-drawn steel pipe (STKM) was employed.

Results of evaluation on the continuous-moldability in each example are set forth in Table 3. Evaluation was done according to the following criteria:

(1) the case wherein continuous molding was carried out with no trouble and unevenness in color was not found is marked with AA;

(2) the case wherein continuous molding was carried out with no trouble but unevenness in color was slightly observed is marked with BB;

(3) the case wherein it was difficult to mold continuously and unevenness in color was clearly observed is marked with CC; and (4) the case wherein continuous molding was impossible is marked with DD.

Each extruded long article was cut to make a test piece (tube-shaped piece, inner diameter: 9.5 mm, outer diameter: 13.5 mm, length: 10 mm). The specific gravity (substitution-in-water method, ASTM D792), the radial crushing strength (JIS Z 2507, unit: kg/cm$^2$), and the porosity of each test piece were measured. The results are set forth in Table 3.

Further, the specific gravity was measured in two positions being apart by 10 cm from each other. The difference in specific gravity between these two positions is set forth in Table 3.

COMPARISON EXAMPLES 1 TO 4

Long extruded porous articles having outer diameter of 15 mm were continuously produced from an aromatic polyimide powder (mean particle size: 12.0 μm or 42.1 μm, specific gravity: 1.40, having the heat loss ratio shown in Table 1) prepared in the same manner as in Example 1 by means of the ram-extrusion apparatus illustrated in FIG. 1 under conditions as shown in Table 2.

Continuous moldability of ram-extrusion molding in each comparison example was evaluated according to the same methods as those in Example 1. The results are set forth in Table 3.

Each extruded article was cut to obtain a test piece similar to that of Example 1. The specific gravity, the radial crushing strength, the porosity, and the difference of specific gravity were measured. The results are set forth in Table 3.

TABLE 1

| | Polyimide Powder | | Material coated |
| --- | --- | --- | --- |
| | Mean Particle Size (μm) | Heat Loss Ratio (wt. %) | over Inner Wall of Mold |
| Example 1 | 12.0 | 0.62 | PTFE |
| 2 | 12.0 | 0.62 | PTFE |
| 3 | 12.0 | 1.78 | PTFE |
| 4 | 22.5 | 0.62 | PTFE |
| 5 | 12.0 | 0.62 | PTFE |
| 6 | 12.0 | 0.62 | PTFE |
| 7 | 12.0 | 0.62 | None |
| Comparison Example 1 | 12.0 | 3.50 | PTFE |
| 2 | 12.0 | 2.23 | PTFE |
| 3 | 42.1 | 0.62 | PTFE |
| 4 | 12.0 | 0.62 | PTFE |

Remark: PTFE = polytetrafluoroethylene

TABLE 2

| | Molding Conditions of Ram-Extrusion Process | | | | | |
| --- | --- | --- | --- | --- | --- | --- |
| | Molding Temperature | | | Pressure | | Rate of |
| | First Heater (°C.) | Second Heater (°C.) | Third Heater (°C.) | Ram Extrusion (kg/cm$^2$) | Back Pressure (kg/cm$^2$) | Extrusion (mm/hr) |
| Example 1 | 365 | 355 | 320 | 500 | 50 | 780 |
| 2 | 365 | 355 | 320 | 700 | 60 | 750 |
| 3 | 365 | 355 | 320 | 540 | 30 | 790 |
| 4 | 365 | 355 | 320 | 500 | 30 | 780 |
| 5 | 365 | 355 | 320 | 480 | 20 | 820 |
| 6 | 365 | 355 | 320 | 350 | 20 | 800 |
| 7 | 365 | 355 | 320 | 500 | 30 | 780 |
| Comparison Example 1 | 365 | 355 | 320 | — | — | — |
| 2 | 365 | 355 | 320 | 900 | 30 | 790 |
| 3 | 365 | 355 | 320 | 480 | 30 | 790 |
| 4 | 365 | 355 | 320 | 1100 | 80 | 790 |

COMPARISON EXAMPLE 5

An aromatic polyimide powder (mean particle size: 12.0 μm, specific gravity: 1.40, having a heat loss ratio of 0.62) prepared in Example 1 was introduced into a mold having a inner diameter of 30 mm, and was molded at pressure of 400 kg/cm$^2$. The molded article was recovered, and heated in an electric oven at 350° C. for 5 hours. Thus, a long molded article having outer diameter of 30 mm and length of 120 mm was obtained.

The molded article was cut to obtain a test piece similar to that of Example 1. The specific gravity, the radial crushing strength, the porosity, and the difference of specific gravity were measured. The results are set forth in Table 3.

TABLE 3

| | Continuous Moldability | Radial Crushing Strength (kg/m$^2$) | Specific Gravity | Difference of Specific Gravity | Porosity (%) |
| --- | --- | --- | --- | --- | --- |
| Example 1 | AA | 610 | 1.27 | 0.02 | 9.29 |
| 2 | BB | 680 | 1.30 | 0.01 | 7.14 |
| 3 | BB | 480 | 1.23 | 0.01 | 12.14 |
| 4 | AA | 400 | 1.20 | 0.02 | 14.29 |
| 5 | AA | 320 | 1.18 | 0.01 | 15.71 |
| 6 | BB | 300 | 1.15 | 0.01 | 17.86 |
| 7 | BB | 430 | 1.23 | 0.01 | 12.14 |
| Comparison Example 1 | DD | — | — | — | — |
| 2 | CC | 110 | 1.04 | 0.02 | 25.71 |
| 3 | BB | 100 | 1.01 | 0.01 | 27.86 |
| 4 | AA | 1100 | 1.37 | 0.02 | 2.14 |

TABLE 3-continued

| Continuous Moldability | Radial Crushing Strength (kg/m²) | Specific Gravity | Difference of Specific Gravity | Porosity (%) |
|---|---|---|---|---|
| 5 | — | 530 | 1.23 | 0.25 | 12.14 |

EXAMPLE FOR USE

The extruded porous article (according to the present invention) obtained in Example 4 was cut to give a test piece in the form of a ring (outer diameter: 12 mm, inner diameter: 8 mm, length: 10 mm). The test piece was then immersed in NBU 15 Base Oil (mineral oil, available from Nippon Cruber Co., Ltd.) within an autoclave, and kept for 1 hour at a reduced pressure (3 mmHg). Thus treated test piece contained 11 wt. % of oil ((weight after immersion-weight before immersion)/weight after immersion×100).

The test piece was arranged on a thrust-type abrader and operated at a rate of 32 m/min. The test piece showed a stable low operating torque and there was observed no essential change in the stable low operating tork even after operation of 3,000 hours. Further, substantially no abrasion was observed at that time.

We claim:

1. An extruded porous article comprising an aggregated aromatic polyimide powder having a second order glass transition temperature of 250° to 380° C. which has a heat loss ratio of not more than 2 wt. %, the heat loss ratio being measured at 360° C. for 1 hour, and a mean particle size in the range of 1 to 40 μm, said aromatic polyimide having been prepared by polymerization and imidation of a tetracarboxylic acid component containing not less than 50 mol. % of biphenyltetracarboxylic acid or an acid dianhydride thereof and an aromatic diamine component containing not less than 40 mol. % of 4,4'-diaminodiphenyl ether, the pores of said article being formed by partial fusion of said polyimide powder at a heating temperature of 300° to 500° C. and being distributed essentially uniformly in the article, the porosity of said article being in the range of 5-20%, the porosity % being defined by the formula:

$$\left(1 - \frac{\text{apparent density of article}}{\text{true density of article}}\right) \times 100.$$

2. The extruded porous article as claimed in claim 1, wherein said porosity is in the range of 6-18%.

3. The extruded porous article as claimed in claim 1, wherein said mean particle size is in the range of 5-30 μm.

4. The extruded porous article as claimed in claim 1, which contains an oil in the pores.

5. The extruded porous article as claimed in claim 1, wherein said aromatic polyimide is a polymer derived from an aromatic tetracarboxylic acid or its derivative consisting essentially of biphenyltetracarboxylic acid or its derivative and an aromatic diamine consisting essentially of 4,4'-diaminodiphenyl ether.

6. The extruded porous article as claimed in claim 1, wherein
said tetracarboxylic acid component contains not less than 70 mol. % biphenyltetracarboxylic acid or an acid dianhydride thereof and said aromatic diamine component contains not less than 50 mol. % of 4,4'-diaminodiphenyl ether.

7. The extruded porous article as claimed in claim 6, wherein said porosity is in the range of 6-18% and said mean particle size is in the range of 5-30 μm.

8. The extruded porous article as claimed in claim 7, wherein said aromatic diamine component contains not less than 70 mol. % of 4,4'-diaminodiphenyl ether.

* * * * *